G. S. SHEFFIELD,

Assignor by mesne assignments, to THE SHEFFIELD VELOCIPEDE CAR COMPANY.

HAND CAR.

No. 10,303. Reissued Apr. 3, 1883.

WITNESSES

Wm. A. Skinkle.

H. W. Elmore.

INVENTOR

George S. Sheffield.

By his Attorneys

Baldwin, Hopkins, & Peyton.

N. PETERS, Photo-Lithographer, Washington, D. C.

UNITED STATES PATENT OFFICE.

GEORGE S. SHEFFIELD, OF THREE RIVERS, MICHIGAN, ASSIGNOR, BY MESNE ASSIGNMENTS, TO THE SHEFFIELD VELOCIPEDE CAR COMPANY, OF SAME PLACE.

HAND-CAR.

SPECIFICATION forming part of Reissued Letters Patent No. 10,303, dated April 3, 1883.

Original No. 213,254, dated March 11, 1879. Reissue No. 9,571, dated February 15, 1881. Application for reissue filed March 7, 1883.

*To all whom it may concern:*

Be it known that I, GEORGE S. SHEFFIELD, of Three Rivers, in the county of St. Joseph and State of Michigan, have invented a new and valuable Improvement in Railway Hand-Cars; and I do hereby declare that the following is a full, clear, and exact description of the construction and operation of the same, reference being had to the annexed drawings, making a part of this specification, and to the letters and figures of reference marked thereon.

Figure 1:
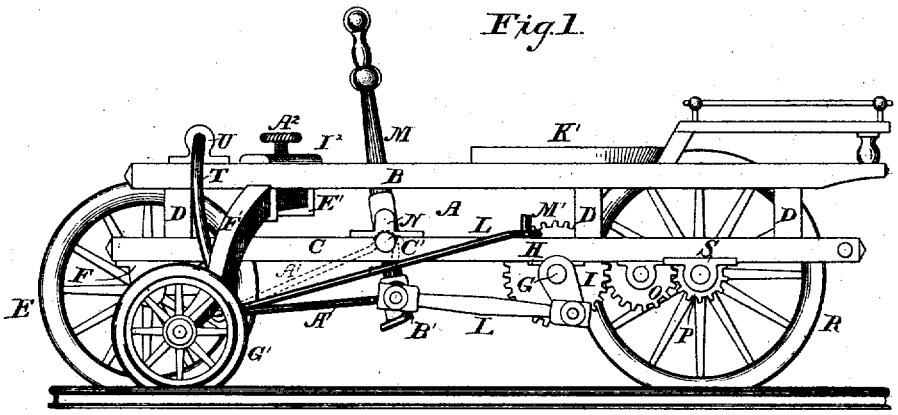
Figure 2:
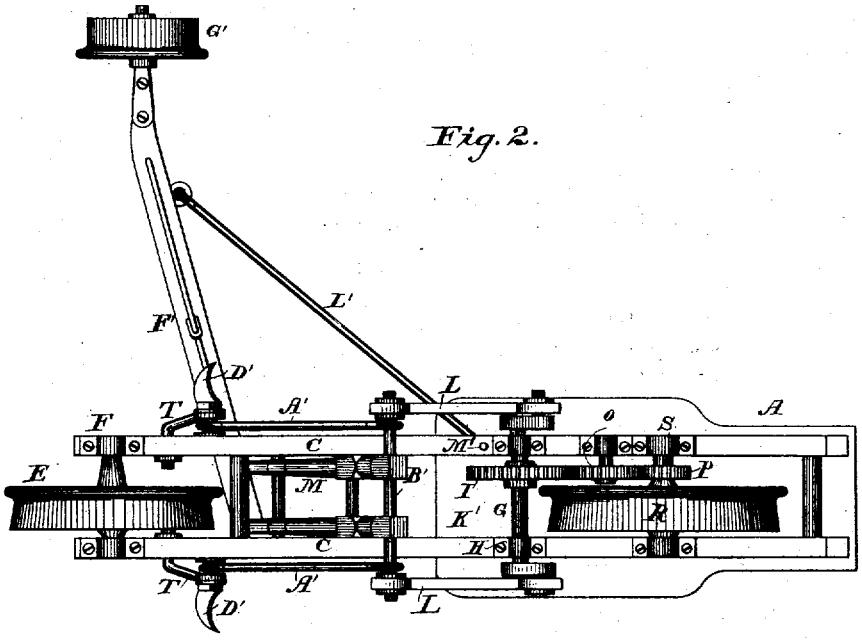

Figure 1 of the drawings is a representation of a side elevation of my railroad hand-car. Fig. 2 is a bottom plan view of the same.

My invention relates to a three-wheeled railway-velocipede or portable hand-car adapted to operate upon a track of broad or narrow gage; and the novelty consists in the construction and combination of parts hereinafter particularly set forth.

In carrying out my invention I employ two longitudinal bars below, connected together and to two similar bars above. In the lower bars I journal a forward riding-wheel and a rear driving-wheel. A crank-shaft carrying a cog-wheel is suitably journaled in the lower bars. A pitman from the crank connects with the arms of a pivoted hand-lever; and the cog-wheel, by a train of multiplying gear, connects with a pinion rigid upon the shaft of the drive-wheel. The object of employing multiplying gear is that the drive-wheel may be made to rotate more rapidly than if the hand-lever were connected directly to it, and thus greater speed of travel of the hand-car can be attained. Pivoted upon the forward end of the upper bars are pendent arms carrying hooked links, which are removably engaged with the arms upon the pivoted hand-lever, and a stud above holds the same firmly up when not in use. A stirrup or foot-rest is secured to the junction of each link and pendant, and may be used in connection with the hand-lever to multiply power, or simply as a foot-brace, as desired. The wheels are slightly beveled from the outer edges of their peripheries toward the flange, which serves to keep them on the rail. Sockets in the frame afford bearings for a lateral arm or axle, which carries a smaller flanged wheel, which traverses the opposite rail in order to confine the car to the track. The lateral arm is adjustably secured in the sockets, so that it can be shifted to adapt the car to a broad or narrow gage road, the said bar being held in the desired position by means of a set-screw extending through a cross-beam secured to the upper longitudinal bars.

The letter A represents the frame of my improved railway-velocipede, consisting of two upper longitudinal parallel bars, B B, and two lower longitudinal parallel bars, C C, the upper and lower bars being connected together by means of a series of vertical standards, D D D.

The letter E represents a forward riding-wheel, journaled in bearings F F at the forward ends of the lower longitudinal bars, C C.

The letter G represents a crank-shaft journaled in bearings H H on the lower bars, C C, and carrying a cog-wheel, I.

The letters L L represent pitmen connected to the crank-pins of the crank-shaft G, and with a hand-lever, M, pivoted in bearings N on the lower bars, C C. The cog-wheel I intermeshes with a smaller cog-wheel, O, which intermeshes in turn with a pinion, P, rigidly mounted on the shaft of the driving-wheel R, which is journaled in bearings S on the lower longitudinal bars, C C. The tread of both the riding-wheel and the driving-wheel is made slightly concave in cross-section, in order to hug the rail and better confine the truck to the track.

The letters T T represent two pendent arms, pivoted in bearings U U on the upper bars, and carrying at their lower ends hooked links A′ A′, which are adapted to be detachably secured to the arm B′ of the hand-lever M.

The letters C′ C′ represent studs, attached to the bars C C, to which the hooked links may be attached when not in use.

D′ represents a stirrup or foot-rest, secured to the junction of each link and pendant, which may be used in connection with the hand-lever to multiply power, or as a foot brace or rest, as may be desired.

The letter E′ represents two sockets, secured to the lower sides of the upper bars, B B, in which is adjustably mounted a lateral arm, F′, carrying at its outer extremity a flanged wheel, G′, which is adapted to traverse the opposite rail to that upon which the riding and driving wheels travel.

The letter $A^2$ represents a set-screw, mounted in a cross-beam, I′, secured to the upper bars, B B, the lower end of said set-screw being adapted to be brought to bear against the lateral arm, so as to confine it in place, when shifted in or out, to adapt the car to broad or narrow gage roads. To the upper longitudinal bars is secured a seat, K′, for the operator, in such position that he may conveniently grasp and operate the hand-lever with his hands, his feet resting upon the stirrups secured to the pendants, which serve, as before mentioned, as foot-braces simply or to multiply the power when the links are secured to the hand-lever.

The letter L′ represents a brace-rod, secured to the lateral arm of the car, and adapted to be detachably secured to a pin, M′, on one of the lower bars, C C, for the purpose of steadying said lateral arm.

The frame A should be strong and rigid, but as light as practicable consistent with firmness and the uses of a hand-car.

By reference to Fig. 2 of the drawings it will be observed that the riding and driving wheels E and R are located not in the center of the frame, but a little to one side of the center in a direction away from the wheel G′. It will also be noticed from the drawings that the driving-gearing propelling the car is placed considerably upon the inside of the center of the frame. This construction is useful, because it throws the center of gravity of the car-frame and weight carried by the riding and driving wheels considerably inside of the track upon which the riding and driving wheels run, and tends to counteract any tendency of the car to overturn in the direction of that side where the riding and driving wheels are. The center of the seat is also by this construction brought inside of the line of the track on which the riding and driving wheels run, so that the weight of a person upon the seat is not likely to be directly over that track, but a little inside of it. Hence to the weight of the arm F′ and the wheel G′, acting as a counter-balance to prevent overturning of a three-wheeled hand-car, is added a considerable part of the weight of the frame and the load it carries, so that this class of three-wheeled hand-cars, having the center of gravity very much toward one side, is still made safe against tipping off the track, which is a very important consideration.

The lateral arm or axle must be sufficiently strong and be rigidly secured to the main part of the car, when properly adjusted to a given gage of track, so that it will be firm, because otherwise it will tend to swing to the rear in whichever direction the car may be running and cause the flange of the wheel G′ to bind on its track. It is convenient for purposes of transportation to have the lateral arm detachable from the frame, and my construction is such, as will be seen from the drawings, that it may be withdrawn from its sockets entirely, as well as adjusted therein.

My improved hand-car is designed not only for lightness and speed, but at the same time, as will be observed from the description and drawings, is framed and constructed upon such a plan as to be capable of sustaining considerable loads, which is important in a hand-car.

The riding and driving wheels should be as small as consistent with the attainment of suitable speed by means of suitable multiplying gear, so as to bring the frame as low down as may be, because it is desirable not only to have the center of gravity of the car as much between the tracks as practicable, but also as low down as practicable, in order to avoid liability of tipping off the tracks, and to be convenient also for the ordinary purposes of a hand-car.

I am aware that a three-wheeled tramway vehicle composed of a frame supported by two wheels for running on one track and a lateral arm provided with a third wheel for running on the other track has heretofore been invented. Such a device is clearly disclosed in original United States Patent No. 93,159, dated August 3, 1869, and reissued Patent No. 9,348, dated August 24, 1880, being the joint invention of John A. Aspinwall and Charles M. Perry. That device consists of an ordinary street-bicycle with a large wheel in front and a small wheel behind it, a light frame, a rider's seat, and propelling and guiding mechanism, designed to run upon one track of a street-railroad, and provided with a detachable lateral arm or axle, to which is secured a third wheel, designed to run upon the other track. In view of that device, clearly disclosing a three-wheeled tramway vehicle, with two of its wheels for running upon one track and a third wheel applied to a lateral arm or axle for running upon the other track, I do not claim, broadly, the invention of a three-wheeled velocipede hand-car; but my invention is limited to certain improvements upon a three-wheeled tramway-vehicle of the type disclosed in the said patents of Aspinwall and Perry, and they are especially designed to adapt such vehicle to the uses of a railway hand-car. My invention is therefore fully comprised in the improved organizations succinctly designated in my appended claims.

Having thus described the construction, operation, and advantages of my improved hand-car, and endeavored to justly distinguish what is new from what is old, what I claim to be new, and desire to secure by Letters Patent of the United States, is—

1. An improvement in a railway hand-car, consisting of the combination, substantially as herein set forth, of a suitable frame supported by two flanged wheels for running upon one track, a suitable hand-lever, and multiplying gear for propelling the car, and a suitable detachable lateral arm or axle provided with a flanged wheel, G′, for running upon the other track.

2. An improvement in a railway hand-car, consisting of the combination, substantially as herein set forth, of a suitable frame supported by two flanged wheels for running upon one track at one side of the center of gravity of the frame, suitable propelling mechanism, and a suitable lateral arm or axle provided with a flanged wheel, G′, for running upon the other track.

3. An improvement in a railway hand-car, consisting of the combination, substantially as herein set forth, of a suitable frame supported by two flanged wheels for running upon one track, suitable propelling mechanism, a suitable lateral arm or axle provided with a flanged wheel, G′, for running upon the other track, and means by which the flanged wheel G′ can be adjusted toward and from the frame to accommodate the car to tracks of different gages.

4. An improvement in a railway hand-car, consisting of the combination, substantially as herein set forth, of a suitable frame supported by two flanged wheels for running upon one track, suitable propelling mechanism located so as to bring the preponderance of its weight inside of the center of the frame, and a suitable lateral arm or axle provided with a flanged wheel, G′, for running upon the other track.

GEORGE S. SHEFFIELD.

Witnesses:

H. E. REED,

O. P. SLOTE.